United States Patent
Endo et al.

(10) Patent No.: US 10,673,070 B2
(45) Date of Patent: Jun. 2, 2020

(54) POSITIVE ACTIVE MATERIAL FOR NONAQUEOUS ELECTROLYTE SECONDARY BATTERY, METHOD FOR PRODUCING SAME, ELECTRODE FOR NONAQUEOUS ELECTROLYTE SECONDARY BATTERY, AND NONAQUEOUS ELECTROLYTE SECONDARY BATTERY

(71) Applicant: GS Yuasa International Ltd., Kyoto-shi, Kyoto (JP)

(72) Inventors: Daisuke Endo, Kyoto (JP); Hiromasa Muramatsu, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 52 days.

(21) Appl. No.: 15/576,079

(22) PCT Filed: May 27, 2016

(86) PCT No.: PCT/JP2016/065763
§ 371 (c)(1),
(2) Date: Nov. 21, 2017

(87) PCT Pub. No.: WO2016/190419
PCT Pub. Date: Dec. 1, 2016

(65) Prior Publication Data
US 2018/0145318 A1 May 24, 2018

(30) Foreign Application Priority Data
May 28, 2015 (JP) .................................. 2015-109002

(51) Int. Cl.
*H01M 6/18* (2006.01)
*H01M 4/505* (2010.01)
(Continued)

(52) U.S. Cl.
CPC ........... *H01M 4/505* (2013.01); *H01M 4/525* (2013.01); *H01M 10/052* (2013.01); *H01M 2004/028* (2013.01)

(58) Field of Classification Search
CPC ...... H01M 4/131; H01M 4/1391; H01M 4/13; H01M 4/362; H01M 4/364; H01M 4/505;
(Continued)

(56) References Cited

U.S. PATENT DOCUMENTS

| 6,040,090 A | 3/2000 | Nishio |
| 8,382,860 B2 | 2/2013 | Nukuda |

(Continued)

FOREIGN PATENT DOCUMENTS

| EP | 2523240 | 11/2012 |
| JP | 11025957 A2 | 1/1999 |

(Continued)

OTHER PUBLICATIONS

International Search Report dated Aug. 9, 2016 filed in PCT/JP2016/065763.

*Primary Examiner* — Raymond Alejandro
(74) *Attorney, Agent, or Firm* — Rankin, Hill & Clark LLP (57) ABSTRACT

Provided is a positive active material for a nonaqueous electrolyte secondary battery which includes a lithium transition metal composite oxide. A molar ratio (Li/Me) of Li and a transition metal (Me) that form the lithium transition metal composite oxide is more than 1. The transition metal (Me) includes Mn, Ni and Co. The lithium transition metal composite oxide has an α-NaFeO$_2$-type crystal structure, an X-ray diffraction pattern attributable to a space group R3-$m$, and a full width at half maximum (FWHM (104)) for the diffraction peak of the (104) plane at a Miller index hkl in X-ray diffraction measurement using a CuKα ray of 0.21° or (Continued)

more and 0.55° or less. A ratio (FWHM (003)/FWHM (104)) of a full width at half maximum for the diffraction peak of the (003) plane and the full width at half maximum for the diffraction peak of the (104) plane at the Miller index hkl is 0.72 or less. Particles of the lithium transition metal composite oxide have a peak differential pore volume of 0.33 mm$^3$/(g·nm) or less.

9 Claims, 5 Drawing Sheets (51) Int. Cl.
H01M 4/525 (2010.01)
H01M 10/052 (2010.01)
H01M 4/02 (2006.01)

(58) Field of Classification Search
CPC ...... H01M 4/502; H01M 4/525; H01M 4/523; H01M 4/80; H01M 10/052; H01M 10/0525; H01M 2004/028
See application file for complete search history.

(56) References Cited

U.S. PATENT DOCUMENTS

| | | | |
|---|---|---|---|
| 8,551,659 | B2 | 10/2013 | Nukuda |
| 9,219,273 | B2 | 12/2015 | Endo |
| 9,543,055 | B2 | 1/2017 | Murai |
| 9,653,725 | B2 | 5/2017 | Nagai |
| 2010/0119945 | A1* | 5/2010 | Akagi ................. H01M 4/131 429/231.8 |
| 2011/0318249 | A1* | 12/2011 | Nakayama .............. C01B 37/00 423/325 |
| 2013/0011726 | A1 | 1/2013 | Takano et al. |
| 2013/0260248 | A1 | 10/2013 | Seki et al. |
| 2014/0004423 | A1 | 1/2014 | Endo |
| 2014/0011091 | A1 | 1/2014 | Endo |
| 2014/0038053 | A1 | 2/2014 | Murakami |
| 2014/0059845 | A1 | 3/2014 | Nukuda |
| 2014/0306151 | A1* | 10/2014 | Endo .................... H01M 4/505 252/182.1 |
| 2015/0086851 | A1* | 3/2015 | Morita ............. H01M 10/0567 429/163 |
| 2017/0117544 | A1 | 4/2017 | Murai |

FOREIGN PATENT DOCUMENTS

| | | | |
|---|---|---|---|
| JP | 2005053764 A2 | 3/2005 | |
| JP | 2010086690 A2 | 4/2010 | |
| JP | 2013051172 A2 | 3/2013 | |
| JP | 2013206552 A2 | 10/2013 | |
| JP | 2014029828 A2 | 2/2014 | |
| JP | 2014029829 A2 | 2/2014 | |
| JP | 2014044928 A2 | 3/2014 | |
| JP | 2014049239 A2 | 3/2014 | |
| JP | 2005-26594 * | 2/2015 | ............ H01M 4/525 |
| JP | 2015026594 A2 | 2/2015 | |
| WO | 2012039413 | 3/2012 | |
| WO | 2012091015 A1 | 7/2012 | |
| WO | WO 2013/084923 * | 6/2013 | ............ H01M 4/525 |
| WO | WO 2013/161083 * | 10/2013 | ........ H01M 10/0567 |

* cited by examiner

POSITIVE ACTIVE MATERIAL FOR NONAQUEOUS ELECTROLYTE SECONDARY BATTERY, METHOD FOR PRODUCING SAME, ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to a positive active material for a nonaqueous electrolyte secondary battery, a method for producing the positive active material, an electrode for a nonaqueous electrolyte secondary battery which contains the positive active material, and a nonaqueous electrolyte secondary battery including the electrode.

BACKGROUND ART

Heretofore, as a positive active material for a nonaqueous electrolyte secondary battery which is represented by a lithium secondary battery, a "LiMeO$_2$-type" active material (Me is a transition metal) having an α-NaFeO$_2$-type crystal structure has been examined, and nonaqueous electrolyte secondary batteries including LiCoO$_2$ have been widely put to practical use. However, the discharge capacity of LiCoO$_2$ is about 120 to 130 mAh/g. As Me, it has been desired to use Mn that is abundant as an earth resource. However, a "LiMeO$_2$-type" active material containing Mn as Me has the problem that when the molar ratio (Mn/Me) of Mn to Me is more than 0.5, the structure is changed to a spinel type-structure when the battery is charged, and thus it is unable to maintain a crystal structure, resulting in very poor charge-discharge cycle performance.

Thus, various kinds of "LiMeO$_2$-type" active materials which have excellent charge-discharge cycle performance and in which the molar ratio (Mn/Me) of Mn to Me is 0.5 or less have been proposed and, and some of these active materials have been put into practical use. For example, a positive active material containing LiNi$_{1/2}$Mn$_{1/2}$O$_2$ or LiNi$_{1/3}$Co$_{1/3}$Mn$_{1/3}$O$_2$ which is a lithium transition metal composite oxide has a discharge capacity of 150 to 180 mAh/g.

Meanwhile, in contrast with so called a "LiMeO$_2$-type" active material as described above, so called a "lithium-excess-type" active material is also known in which the composition ratio Li/Me of lithium (Li) to the ratio of a transition metal (Me) is greater than 1, with Li/Me being, for example, 1.2 to 1.6.

Patent Document 1 discloses "a positive active material for a nonaqueous electrolyte secondary battery, the positive active material comprising a lithium transition metal composite oxide which has an α-NaFeO$_2$ type crystal structure, and is represented by a composition formula Li$_{1+α}$Me$_{1-α}$O$_2$ (Me is a transition metal element including Co, Ni and Mn, and α>0) and in which the molar ratio (Li/Me) of Li to the transition metal element Me is 1.2 to 1.6, wherein the molar ratio (Co/Me) of Co to the transition metal element Me is 0.02 to 0.23, the molar ratio Mn/Me of Mn to the transition metal element Me is 0.62 to 0.72, and the positive active material is observed as a single phase attributed to a space group R3-m on an X-ray diffraction diagram when electrochemically oxidized to a potential of 5.0 V (vs. Li/Li$^+$)" (claim 1).

Patent Document 1 suggests in examples that a coprecipitation carbonate precursor of a transition metal element including Co, Ni and Mn and lithium carbonate are mixed, and fired to synthesize a lithium transition metal composite oxide (see paragraphs [0083] to [0086], [0109], Table 2 in paragraph [0119], and Table 3 in paragraph [0120]).

In addition, a positive active material for a nonaqueous electrolyte secondary battery is known which contains a lithium transition metal composite oxide in which the full width at half maximum for each of the diffraction peaks of the (003) plane and the (104) plane in X-ray diffraction measurement is defined (see, for example, Patent Documents 2 to 5).

Patent Document 2 discloses "a lithium secondary battery comprising: a current collector; and an active material layer held in the current collector and containing active material particles, wherein the active material particle is a secondary particle formed by aggregating a plurality of primary particles of a lithium transition metal oxide, and has a hollow structure with a hollow portion formed in the secondary particle and a shell portion surrounding the hollow portion, the secondary particle is provided with a through-hole extending through the secondary particle from the outside to the hollow portion, and in a powder X-ray diffraction pattern of the active material particle, the ratio (A/B) of a full width at half maximum A of a diffraction peak obtained from the (003) plane and a full width at half maximum B of a diffraction peak obtained from the (104) plane satisfies the following formula: (A/B)≤0.7" (claim 1), and "the secondary battery according to claim 1, wherein the lithium transition metal oxide is a compound having a layered crystal structure represented by the following general formula:

(in the formula (1), x, y, z, α, and β are real numbers satisfying all of 0≤x≤0.2, 0.1<y<0.9, 0.1<z<0.4, 0.0005≤α≤0.01 and 0≤β≤0.01, and M is not present, or is one or more elements selected from the group consisting of Zr, Mg, Ca, Na, Fe, Cr, Zn, Si, Sn, Al, B and F)" (claim 6).

Patent Document 2 suggest in paragraphs [0073] to [0082] that combined hydroxide particles obtained with adjustment made so that the amount of W added was 0.5 mol % based on 100 mol % of a raw material having a molar ratio of Ni:Co:Mn of 0.33:0.33:0.33, and lithium carbonate were mixed such that the Li/Me ratio was about 1.15, and the resulting mixture was fired to produce active material particles including a lithium transition metal composite oxide and having a hollow structure or a solid structure.

Patent Document 3 discloses "an active material having a layered structure and having a composition represented by the following formula (1), wherein the ratio of a full width at half maximum FWHM$_{003}$ of the (003) plane and a full width at half maximum FWHM$_{104}$ (104) of the (104) plane in a powder X-ray diffraction diagram is represented by the following formula (2), and the average primary particle size is 0.2 μm to 0.5 μm:

[in the formula (1), the element M is at least one element selected from the group consisting of Al, Si, Zr, Ti, Fe, Mg, Nb, Ba and V, and 1.9≤(a+b+c+d+y)≤2.1, 1.0<y≤1.3, 0<a≤0.3, 0<b≤0.25, 0.3≤c≤0.7, 0≤d≤0.1, and 1.9≤x≤2.1.]

Patent Document 3 suggests in examples that citric acid is added to and reacted with an aqueous solution of a raw material mixture of lithium acetate dihydrate, cobalt acetate tetrahydrate, manganese acetate tetrahydrate, nickel acetate tetrahydrate and the like to obtain a precursor, and the precursor is fired to obtain a lithium compound (active material) such as $Li_{1.2}Ni_{0.17}Co_{0.07}Mn_{0.56}O_2$ (see paragraphs [0050], [0051] and [0062]).

Patent Document 4 discloses "an active material for a lithium secondary battery which comprises a solid solution of a sodium-containing lithium transition metal composite oxide having an α-NaFeO$_2$-type crystal structure, wherein the chemical composition formula of the solid solution satisfies $Li_{1+x-y}Na_yCo_aNi_bMn_cO_{2+d}$ (0<y≤0.1, 0.4≤c≤0.7, x+a+b+c=1, 0.1≤x≤0.25, −0.2≤d≤0.2), the active material has an X-ray diffraction pattern attributable to a hexagonal crystal (space group P3$_1$12), and in the Miller index hkl, the full width at half maximum for the diffraction peak of the (003) is 0.30° or less and the full width at half maximum for the diffraction peak of the (114) plane is 0.50° or less" (claim 1).

In addition, Patent Document 4 suggests in paragraph [0052] that "one of indications of the degree of crystallization is a full width at half maximum for the X-ray diffraction peak as described above; it is necessary that in an X-ray diffraction pattern attributed to the space group P3$_1$12, the full width at half maximum for the diffraction peak of the (003) plane be 0.30° or less, and the full width at half maximum for the diffraction peak of the (114) plane be 0.50° or less for improving low-temperature characteristics in the invention; and the full width at half maximum for the diffraction peak of the (003) plane is preferably 0.17° to 0.30°, and the full width at half maximum for the diffraction peak of the (114) plane is preferably 0.35° to 0.50°".

Patent Document 4 suggests in Examples 1 to 4 that for a lithium transition metal composite oxide obtained by mixing a coprecipitation hydroxide precursor of a transition metal, lithium hydroxide monohydrate and sodium carbonate so as to have various compositions, and firing the resulting mixture at 1000° C., the full width at half maximum for the diffraction peak of the (003) plane is 0.20°, and the full width at half maximum for the diffraction peak of the (114) plane is 0.40° (see paragraphs [0074] to [0078], and Table 1 in paragraph [0102]).

Patent Document 5 discloses "a positive active material for a lithium secondary battery which comprises a lithium transition metal composite oxide represented by the composition formula: $Li_{1+\alpha}Me_{1-\alpha}O_2$ (Me is a transition metal element including Co, Ni and Mn, and 1.2<(1+α)/(1−α) <1.6), wherein in the lithium transition metal composite oxide, the molar ratio (Co/Me) of Co to Me is 0.24 to 0.36, and when the space group R3-m is used as a crystal structure model on the basis of an X-ray diffraction pattern, the full width at half maximum for the diffraction peak attributed to the (003) plane is in a range of 0.204° to 0.303°, or the full width at half maximum for the diffraction peak attributed to the (104) plane is in a range of 0.278° to 0.424°"" (claim 1).

In addition, Patent Document 5 suggests in paragraph [0025] that "the peak differential pore volume is preferably 0.85 mm$^3$/(g·nm) or more; and when the peak differential pore volume is 0.85 mm$^3$/(g·nm) or more, a lithium secondary battery excellent in initial efficiency can be obtained".

In Examples 3 to 6, a lithium transition metal composite oxide prepared from a carbonate precursor, and having a Li/Me ratio of 1.3, a Mn/Me ratio of 0.52 to 0.44 and a Co/Me ratio of 0.28 to 0.36 is disclosed (see paragraphs [0066] to [0068] and Table 1 in paragraph [0096]).

Patent Document 6 discloses "a mixed active material for a lithium secondary battery which comprises two kinds of lithium transition metal composite oxide particles with different particle sizes in which the transition metal oxide has an α-NaFeO$_2$ structure, the transition metal (Me) includes Co, Ni and Mn, and the molar ratio (Li/Me) of lithium (Li) to the transition metal is more than 1, wherein the first lithium transition metal composite oxide particle with a larger particle size has a peak differential pore volume of 0.8 mm$^3$/(g·nm) or more at a pore size in a range of 30 to 40 nm where the differential pore volume determined by a BJH method from an adsorption isotherm using a nitrogen gas adsorption method shows the maximum value, and the second lithium transition metal composite oxide particle with a smaller particle size has a peak differential pore volume of 0.5 mm$^3$/(g·nm) or less at a pore size in a range of 50 to 70 nm where the differential pore volume determined by a BJH method from an adsorption isotherm using a nitrogen gas adsorption method shows the maximum value" (claim 1).

Patent Document 6 suggests in examples that the second lithium transition metal composite oxide particle is prepared by mixing lithium hydroxide monohydrate with a coprecipitation hydroxide precursor, and firing the resulting mixture (see paragraphs [0078] to [0080]), and that "the second lithium transition metal composite oxide particles in Examples 1 to 16 and Comparative Examples 1 to 4 to 6 and 8 had a peak differential pore volume of 0.3 to 0.5 mm$^3$/(g·nm) at a pore size in a range of 50 to 70 nm" (see paragraph [0116]).

PRIOR ART DOCUMENTS

Patent Documents

Patent Document 1: WO2012/091015
Patent Document 2: JP-A-2013-51172
Patent Document 3: JP-A-2013-206552
Patent Document 4: WO2012/039413
Patent Document 5: JP-A-2014-44928
Patent Document 6: JP-A-2015-26594

DISCLOSURE OF THE INVENTION

Problems to be Solved by the Invention

The discharge capacity of so called a "lithium-excess-type" active material as described above is generally higher than that of so called a "LiMeO$_2$-type" active material as described in Patent Document 1.

Figure 3:
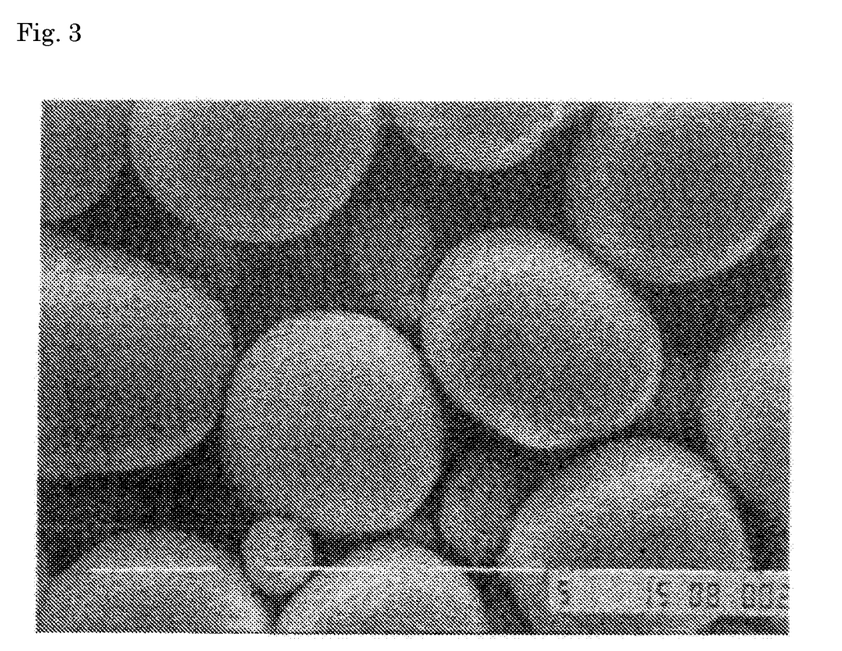
FIG. 3 shows a SEM photograph of a lithium transition metal composite oxide in a comparative example.
Figure 4:
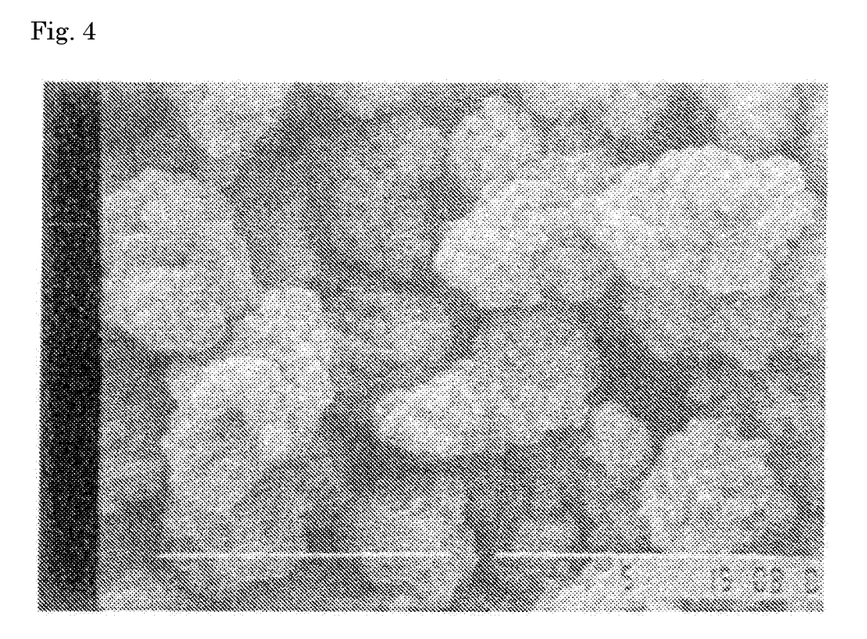
FIG. 4 shows a SEM photograph of a lithium transition metal composite oxide in another comparative example.

In addition, when a coprecipitation carbonate precursor of a transition metal element is used as a precursor for producing an active material, an active material containing porous and fine primary particles is obtained as shown in FIG. 3 described later. Therefore, a particle form advantageous for diffusion of Li ions is obtained, so that high rate discharge performance can be improved. However, an active material obtained using a carbonate precursor does not have a sufficient capacity per volume, although it has an excellent capacity per weight. On the other hand, when a coprecipitation hydroxide precursor of a transition metal element is used as the precursor, a high density active material can be obtained as shown in FIG. 4 described later, but the particle size easily increases. Therefore, when this production method is applied to a "lithium-excess-type" active material, the diffusion efficiency of Li ions is deteriorated, so that it is difficult to improve the capacity per volume.

In Patent Document 2, the positive active material is made to have a hollow structure in order to improve the power in a low SOC range, and therefore rather the capacity per volume decreases. Thus, Patent Document 2 cannot be intended to improve the capacity per volume.

In Patent Document 3, it is difficult to obtain a high-density active material because the active material is obtained by preparing a precursor by a sol-gel method with citric acid added to an acetate aqueous solution, and firing the resulting mixture.

In Patent Document 4, sodium is added in a lithium transition metal composite oxide for improving low-temperature characteristics, and the invention in Patent Document 4 is not intended to increase the capacity per volume.

In Patent Document 5, a lithium transition metal composite oxide produced from a carbonate precursor is used as an active material, and the active material has a peak differential pore volume of 0.85 mm$^3$/(g·nm) or more, and is therefore a porous active material. Thus, Patent Document 5 is not intended to increase the capacity per volume.

Patent Document 6 discloses lithium transition metal composite oxide particles prepared from a coprecipitation precursor and having a peak differential pore volume of 0.3 to 0.5 mm$^3$/(g·nm), but does not mention either the full width at half maximum for the diffraction peak of the particles or improvement of the capacity per volume.

An object of the present invention is to provide a positive active material having an excellent capacity per volume, a method for producing the positive active material, an electrode for a nonaqueous electrolyte secondary battery which contains the positive active material, and a nonaqueous electrolyte secondary battery including the electrode.

Means for Solving the Problems

For achieving the above-mentioned object, one aspect of the present invention employs positive active materials for a nonaqueous electrolyte secondary battery as described below.

One aspect of the present invention provides a positive active material for a nonaqueous electrolyte secondary battery, including a lithium transition metal composite oxide. A molar ratio (Li/Me) of Li and a transition metal (Me) that form the lithium transition metal composite oxide is more than 1. The transition metal (Me) includes Mn, Ni and Co. The lithium transition metal composite oxide has an α-NaFeO$_2$-type crystal structure, an X-ray diffraction pattern attributable to a space group R3-m, and a full width at half maximum (FWHM (104)) for the diffraction peak of the (104) plane at a Miller index hkl in X-ray diffraction measurement using a CuKα ray of 0.21° or more and 0.55° or less. A ratio (FWHM (003)/FWHM (104)) of a full width at half maximum for the diffraction peak of the (003) plane to the full width at half maximum for the diffraction peak of the (104) plane is 0.72 or less. Particles of the lithium transition metal composite oxide have a peak differential pore volume of 0.33 mm$^3$/(g·nm) or less as determined by a BJH method from an adsorption isotherm using a nitrogen gas adsorption method.

One aspect of the present invention also provides a positive active material for a nonaqueous electrolyte secondary battery, including a lithium transition metal composite oxide. A molar ratio (Li/Me) of Li and a transition metal (Me) that form the lithium transition metal composite oxide is more than 1. The transition metal (Me) includes Mn, Ni and Co. The lithium transition metal composite oxide has an α-NaFeO$_2$-type crystal structure, an X-ray diffraction pattern attributable to a space group P3$_1$12, and a full width at half maximum (FWHM (114)) for the diffraction peak of the (114) plane at a Miller index hkl in X-ray diffraction measurement using a CuKα ray of 0.21° or more and 0.55° or less. A ratio (FWHM (003)/FWHM (114)) of a full width at half maximum for the diffraction peak of the (003) plane to the full width at half maximum for the diffraction peak of the (114) plane is 0.72 or less. Particles of the lithium transition metal composite oxide have a peak differential pore volume of 0.33 mm$^3$/(g·nm) or less as determined by a BJH method from an adsorption isotherm using a nitrogen gas adsorption method.

Another aspect of the present invention provides a method for producing the positive active material for a nonaqueous electrolyte secondary battery, the method including firing a hydroxide precursor of the transition metal and a lithium compound at 800 to 940° C.

Still another aspect of the present invention provides an electrode for a nonaqueous electrolyte secondary battery which includes the positive active material for a nonaqueous electrolyte secondary battery, and a nonaqueous electrolyte secondary battery including the electrode for a nonaqueous electrolyte secondary battery.

Advantages of the Invention

According to the present invention, there can be provided a positive active material for a nonaqueous electrolyte secondary battery which has a large discharge capacity per volume, a method for producing the positive active material, an electrode for a nonaqueous electrolyte secondary battery which contains the positive active material, and a nonaqueous electrolyte secondary battery including the electrode.

MODE FOR CARRYING OUT THE INVENTION

The composition of a lithium transition metal composite oxide contained in an active material for a lithium secondary battery according to an embodiment is that of so called a "lithium-excess-type" which contains a transition metal element Me including Co, Ni and Mn as well as Li and can be denoted as Li$_{1+\alpha}$Me$_{1-\alpha}$O$_2$ (α>0) from the viewpoint of obtaining a high discharge capacity.

In this embodiment, the molar ratio (Li/Me) of Li to the transition metal element Me, which is represented by $(1+\alpha)/(1-\alpha)$ in the composition formula of Li$_{1+\alpha}$Me$_{1-\alpha}$O$_2$, is preferably 1.15 or more and 1.30 or less. When the molar ratio (Li/Me) is within the above-mentioned range, the discharge capacity per volume is improved. The molar ratio (Mn/Me) of Mn to the transition metal element Me is preferably 0.42 to 0.66, more preferably 0.45 to 0.60. When the molar ratio (Mn/Me) is within the above-mentioned range, it is possible to improve the powder density while maintaining the discharge capacity per unit weight, and the discharge capacity per volume is improved. Co has an effect of improving initial efficiency, but when the amount of Co is excessively large, growth of a crystallite proceeds, so that the FWHM (003) tends to be excessively small. In addition, Co is expensive because it is a scarce resource. Therefore, the molar ratio (Co/Me) of Co to the transition metal element Me is preferably less than 0.24, more preferably less than 0.18, especially preferably less than 0.15. When the molar ratio (Li/Me) is within the above-mentioned range, the discharge capacity per volume is improved.

With such a composition, a lithium secondary battery having a large discharge capacity per volume can be obtained.

The lithium transition metal composite oxide according to this embodiment has an $\alpha$-NaFeO$_2$ structure. The lithium transition metal composite oxide after synthesis (before charge-discharge is performed) is attributed to the space group P3$_1$12 or R3-m. Among them, in those attributed to the space group P3$_1$12, a superlattice peak (peak found in a (Li[Li$_{1/3}$Mn$_{2/3}$]O$_2$-type monoclinic crystal) is observed at around $2\theta=21°$ on an X-ray diffraction pattern using a CuK$\alpha$ bulb. However, when charge is carried out at least once, so that Li in the crystal is deintercalated, the symmetry of the crystal is changed. Consequently, the superlattice peak disappears, and the lithium transition metal composite oxide is attributed to the space group R3-m. Here, P3$_1$12 is a crystal structure model in which atom positions at 3a, 3b and 6c sites in R3-m are subdivided, and the P3$_1$12 model is employed when there is orderliness in atom arrangement in R3-m. Properly speaking, "R3-m" is written with a bar "-" added above "3" of "R3m".

In the lithium transition metal composite oxide according to this embodiment, when the space group R3-m is used as a crystal structure model on the basis of an X-ray diffraction pattern, the full width at half maximum (FWHM (104)) for the diffraction peak attributed to the (104) plane is in a range of 0.21° to 0.55°, and the ratio of the full width at half maximum for the diffraction peak attributed to the (003) plane to the full width at half maximum for the diffraction peak attributed to the (104) plane, i.e. the value of FWHM (003)/FWHM (104) is 0.72 or less. Such a crystal structure makes it possible to increase the discharge capacity per volume.

The diffraction peak at $2\theta=18.6°\pm1°$ is indexed to the (003) plane in the Miller index hkl for space groups P3$_1$12 and R3-m, and the diffraction peak at $2\theta=44.1°\pm1°$ is indexed to the (114) plane for the space group P3$_1$12 and to the (104) plane for the space group R3-m.

The FWHM (104) is an index of the crystallinity degree in all directions. When the FWHM (104) is excessively small, crystallization excessively proceeds, so that the crystallite increases, and thus Li ions are not sufficiently diffused. When the FWHM (104) is excessively large, transportation efficiency of Li ions is reduced because the crystallinity degree is low. Therefore, the FWHM (104) is in a range of 0.21° or more and 0.55° or less.

The FWHM ratio is an index of the crystallinity along the c-axis direction with respect to the crystallinity degree in all directions in the crystal structure. If the value of FWHM (003)/FWHM (104) is excessively large, the degree of crystal growth in the c-axis direction decreases, so that removal and insertion of Li ions from a gap between layers can not be performed smoothly. Therefore, the value of FWHM (003)/FWHM (104) is 0.72 or less. In addition, when the value of FWHM (003)/FWHM (104) is not excessively small, dissolution of Mn due to an increase in contact area between the crystal grain boundary and the electrolyte solution can be suppressed. Therefore, the value of FWHM (003)/FWHM (104) is preferably 0.57 or more.

[Measurement of Full Width at Half Maximum]

The full width at half maximum for the lithium transition metal composite oxide is measured using an X-ray diffractometer (manufactured by Rigaku Corporation, model name: MiniFlex II). Specifically, the measurement is performed in accordance with the following conditions and procedure.

The ray source is CuK$\alpha$, and the acceleration voltage and current are 30 kV and 15 mA, respectively. The sampling width is 0.01 deg, the scanning time is 14 minutes (scanning speed is 5.0), the divergence slit width is 0.625 deg, the light receiving slit width is open, and the scattering slit is 8.0 mm. For the obtained X-ray diffraction data, the peak derived from K$_{\alpha 2}$ is not removed, and using "PDXL" as attached software of the X-ray diffraction apparatus, the full width at half maximum FWHM (003) for the X-ray diffraction peak indexed to the (003) plane for the space group R3-m and existing on the X-ray diffraction diagram $2\theta=18.6°\pm1°$, and the full width at half maximum FWHM (104) for the X-ray diffraction peak indexed to the (104) plane and existing on the X-ray diffraction diagram $2\theta=44.1°\pm1°$ are determined.

The active material according to this embodiment has a peak differential pore volume of 0.33 mm$^3$/(g·nm) or less as determined by a BJH method from an adsorption isotherm using a nitrogen gas adsorption method. The peak differential pore volume is preferably 0.32 mm$^3$/(g·nm) or less. Such a active material having a high density can be obtained by firing a transition metal hydroxide precursor and a lithium compound.

[Measurement of Peak Differential Pore Volume]

For measurement of the peak differential pore volume of lithium transition metal composite oxide particles, a battery in a discharged state is disassembled to take out a positive electrode plate, lithium transition metal composite oxide particles as an active material in the positive electrode plate are collected in accordance with the following procedure, and the particles are measured using "autosorb iQ" manufactured by Quantachrome Instruments Inc., and control/analysis software "ASiQwin".

An electrolyte solution deposited on an electrode is thoroughly washed out with dimethyl carbonate, drying is performed at room temperature a whole day and night, and a mixture on an aluminum foil current collector is then collected. This mixture is fired at 600° C. for 4 hours using a small electric furnace to remove carbon as a conductive agent and a PVdF binder as a binding agent to obtain only lithium transition metal composite oxide particles.

Lithium transition metal composite oxide particles (1.00 g) separated as described above are placed in a sample tube for measurement, and vacuum-dried at 120° C. for 12 h to sufficiently remove moisture in the measurement sample. Next, by a nitrogen gas adsorption method using liquid nitrogen, isotherms on the adsorption side and the desorption side are measured at a relative pressure P/P0 (P0=about 770 mmHg) ranging from 0 to 1. Then, a pore distribution is evaluated by performing a calculation by BJH method using the isotherm on the desorption side, and a peak differential pore volume is determined.

For the method for bringing the battery into a discharged state before disassembling the battery to take out the positive electrode plate, the following procedure is employed. First, a constant current charge is performed at a current of 0.1 CmA to a battery voltage at which the potential of the positive electrode is 4.3 V (vs. Li/Li$^+$), and constant voltage charge is performed at the same battery voltage until the current value decreases to 0.01 CmA, so that the battery is brought into a charge end state. After a pause is made for 30 minutes, constant current discharge is performed at a current of 0.1 CmA to a battery voltage at which the potential of the positive electrode is 2.0 V (vs. Li/Li$^+$), so that the battery is brought into a discharge end state. In examples described later, a battery including a metal lithium electrode as a negative electrode is brought into a discharge end state or a charge end state, followed by disassembling the battery to take out the electrode, but the battery may be disassembled to take out the electrode, followed by assembling a battery including a metal lithium electrode as a counter electrode, and then adjusting the battery to a discharge end state in accordance with the procedure described above.

[Method for Producing Active Material]

A method for producing the active material for a nonaqueous electrolyte secondary battery according to this embodiment will now be described.

The active material for a nonaqueous electrolyte secondary battery according to the present invention can be obtained essentially by preparing a raw material containing metal elements (Li, Mn, Co and Ni), which form the active material, in accordance with a desired composition of the active material (oxide), and firing the prepared raw material. For the amount of the Li raw material, however, it is preferable to incorporate the Li raw material in an excessive amount by about 1 to 5% in consideration of elimination of a part thereof during firing.

In preparation of an oxide having a desired composition, so called a "solid phase method" in which salts of Li, Co, Ni and Mn are mixed and fired, and so called a "coprecipitation method" in which a coprecipitation precursor with Co, Ni and Mn existing in one particle is prepared beforehand, and a Li salt is mixed thereto, and the mixture is fired are known. In the synthesis process of the "solid phase method", particularly Mn is hard to be uniformly dissolved with Co and Ni, and therefore it is difficult to obtain a sample in which the elements are uniformly distributed in one particle. So far, in documents and so on, many attempts have been made to dissolve Mn with a part of Ni or Co (LiNi$_{1-x}$Mn$_x$O$_2$ etc.) by the solid phase method, but by selecting the "coprecipitation method", a uniform phase is more easily obtained at an atomic level. Thus, in Examples described later, the "coprecipitation method" is employed.

In preparation of a coprecipitation precursor, Mn is most easily oxidized among Co, Ni and Mn, so that it is not easy to prepare a coprecipitation precursor in which Co, Ni and Mn are homogeneously distributed in a divalent state. Therefore, homogeneous mixing of Co, Ni and Mn at an atomic level tends to be insufficient. Particularly in the composition range in this embodiment, the ratio of Mn is high as compared to the ratios of Co and Ni, and therefore it is particularly important to remove dissolved oxygen in an aqueous solution. Examples of the method for removing dissolved oxygen include a method in which a gas containing no oxygen is bubbled. The gas containing no oxygen is not limited, but a nitrogen gas, an argon gas, carbon dioxide ($CO_2$) or the like can be used. A reducing agent such as hydrazine may be included in an aqueous solution.

pH in the step of producing a precursor by coprecipitating in a solution a compound containing Co, Ni and Mn is not limited, but can be set at 10.5 to 14 when the coprecipitation precursor is prepared as a coprecipitation hydroxide precursor (hereinafter, referred to as a "hydroxide precursor"). It is preferable to control pH for increasing the tap density. By setting pH at 11.5 or less, it can be ensured that the tap density is 1.00 g/cm$^3$ or more, so that high rate discharge performance can be improved. Further, by setting pH at 11.0 or less, the particle growth rate can be accelerated, so that the stirring duration after completion of dropwise addition of a raw material aqueous solution can be reduced.

The coprecipitation precursor core is preferably a compound with Mn, Ni and Co mixed homogeneously. In this embodiment, the coprecipitation precursor is preferably a hydroxide for densifying the inside of the positive active material, making it possible to reduce the particle size, and preventing deposition of the active material on a roll during pressing of the electrode. A precursor having a higher bulk density can also be prepared by using a crystallization reaction using a complexing agent. At this time, by carrying out mixing/firing with a Li source, an active material having a high density, so that the energy density per volume of the electrode can be increased.

Further, it is preferable to use a reducing agent together with the complexing agent. Ammonia can be used as the complexing agent, and hydrazine can be used as the reducing agent. When the pH is 10.5 to 14, it is preferable that ammonia concentration is 0.1 to 2.0 M, and the hydrazine concentration is 0.02 to 1.0 M.

Examples of the raw material of the hydroxide precursor may include manganese oxide, manganese carbonate, manganese sulfate, manganese nitrate and manganese acetate for the Mn compound, nickel hydroxide, nickel carbonate, nickel sulfate, nickel nitrate and nickel acetate for the Ni compound, and cobalt sulfate, cobalt nitrate and cobalt acetate for the Co compound.

In this embodiment, a reaction crystallization method for obtaining a hydroxide precursor by adding dropwise a raw material aqueous solution of a hydroxide precursor into a reaction tank kept alkaline is employed. Here, sodium hydroxide or lithium hydroxide can be used as the neutralizing agent.

A method is preferable in which a mixed alkaline solution containing sodium hydroxide, ammonia and hydrazine as necessary while a raw material aqueous solution of the hydroxide precursor is supplied dropwise.

The rate of dropwise addition of the raw material aqueous solution significantly influences homogeneity of the element distribution within one particle of the hydroxide precursor generated. Particularly, Mn is hard to form a homogeneous element distribution with Co and Ni, and therefore requires care. For the preferred dropwise addition rate, it depends on the size of the reaction tank, stirring conditions, pH, the reaction temperature and so on, but is preferably 30 ml/min or less. For increasing the discharge capacity, the dropwise addition rate is more preferably 10 ml/min or less, most preferably 5 ml/min or less.

When a complexing agent such as ammonia is present in the reaction tank, and certain convection conditions are applied, rotation and revolution, in a stirring tank, of particles are promoted by further continuing stirring after completion of dropwise addition of the raw material aqueous solution, and in this process, particles are grown stepwise into a concentric circular sphere while colliding with one another. That is, hydroxide precursor is formed through reactions in two stages, i.e. a metal complex formation reaction when the raw material aqueous solution is added dropwise into the reaction tank and a precipitate formation reaction that occurs during retention of the metal complex in the reaction tank. Therefore, by appropriately selecting a time during which stirring is further continued after completion of dropwise addition of the raw material aqueous solution, a hydroxide precursor having a desired particle size can be obtained.

For the preferred time during which stirring is continued after completion of dropwise addition of the raw material aqueous solution, it depends on the size of the reaction tank, stirring conditions, pH, the reaction temperature and so on, but is, for example, preferably 0.5 h or more, more preferably 1 h or more for growing particles as uniform spherical particles. For reducing the possibility that the particle size is so large that the power performance of the battery in the low-SOC region is not sufficient, the time is preferably 15 h or less, more preferably 10 h or less, most preferably 5 h or less.

The preferred stirring duration time for ensuring that D50, i.e. a particle size is 5 μm or less, at which the cumulative volume in the particle size distribution of secondary particles of the hydroxide precursor and the lithium transition metal composite oxide is 50%, varies depending on controlled pH. For example, the stirring duration time is preferably 3 to 10 h when pH is controlled to 11.5 to 14, and the stirring duration time is preferably 1 to 5 h when pH is controlled to 10.5 to 11.5.

When particles of the hydroxide precursor are prepared using as a neutralizer a sodium compound such as sodium hydroxide, sodium ions deposited on particles are washed off in a subsequent washing step. For example, such conditions that the number of washings with 100 ml of ion-exchange water is 5 or more can be employed when the prepared hydroxide precursor is extracted by suction filtration.

The active material for a nonaqueous electrolyte secondary battery according to the present invention can be suitably prepared by mixing the hydroxide precursor and a Li compound, followed by heat-treating the mixture. By using, as the Li compound, lithium hydroxide, lithium carbonate, lithium nitrate, lithium acetate or the like, the active material can be suitably produced. For the amount of the Li compound, however, it is preferable to incorporate the Li compound in an excessive amount by about 1 to 5% in consideration of elimination of a part thereof during firing.

The firing temperature affects the reversible capacity of the active material.

When the firing temperature is excessively high, the resulting active material is collapsed while causing an oxygen releasing reaction, and in addition to a hexagonal crystal as a main phase, a phase defined as a monoclinic crystal Li[Li$_{1/3}$Mn$_{2/3}$]O$_2$ type tends to be observed as a separated phase rather than a solid solution phase. It is not preferable that such a separated phase is included in an excessively large amount because the reversible capacity of the active material is decreased. In such a material, impurity peaks are observed around 35° and around 45° on the X-ray diffraction diagram. Therefore, the firing temperature is preferably lower than a temperature at which the oxygen releasing reaction of the active material has an influence. The oxygen release temperature of the active material is approximately 1000° C. or higher in the composition range according to this embodiment, but since the oxygen release temperature slightly varies depending on the composition of the active material, it is preferable to examine the oxygen release temperature of the active material beforehand. In particular, care is needed because it is known that as the amount of Co contained in the sample increases, the oxygen release temperature of the hydroxide precursor shifts to the lower temperature. As a method for examining the oxygen release temperature of the active material, a mixture of a hydroxide precursor and a lithium compound may be subjected to a thermogravimetric analysis (DTA-TG measurement) for simulating a firing reaction process. However, in this method, platinum used in a sample chamber of measuring equipment may be corroded by a volatilized Li component to damage the equipment. Therefore, a composition crystallized to some degree by applying a firing temperature of about 500° C. beforehand should be subjected to thermogravimetric analysis.

On the other hand, when the firing temperature is excessively low, the crystallization does not sufficiently proceed, and thus electrode characteristics tend to be lowered. In this embodiment, the firing temperature is preferably 700° C. or higher. By sufficiently performing crystallization, the resistance of the crystal grain boundary can be reduced to promote smooth transportation of lithium ions.

In addition, the inventors have minutely analyzed the full width at half maximum for the diffraction peak of the active material according to this embodiment, and thus found that in a sample synthesized at a temperature of not higher than 750° C., strain remains in a lattice, and when the sample is synthesized at a temperature higher than 750° C., strain can be almost eliminated. In addition, the size of the crystallite increases in proportion with an increase in synthesis temperature. Accordingly, in the composition of the active material according to the present embodiment, a favorable discharge capacity is achieved by trying to obtain particles having little lattice strain in the system and having a sufficiently grown crystallite size. Specifically, it has been found that it is preferable to employ a synthesis temperature (firing temperature) and Li/Me ratio composition such that the amount of strain affecting the lattice constant is 2% or less, and the crystallite size is grown to 50 nm or more. When charge-discharge is performed with an electrode formed from such an active material, there is a change due to expansion and shrinkage, but from the viewpoint of an effect obtained, it is preferable that the crystallite size is kept 30 nm or more even in the charge-discharge process. That is, only when the firing temperature is selected so as to be as close as possible to the oxygen release temperature of the active material, an active material having a remarkably large reversible capacity can be obtained.

As described above, the preferred firing temperature varies depending on the oxygen release temperature of the active material, and therefore it is difficult to definitely set the preferred range of the firing temperature, but the firing temperature is preferably 800 to 940° C. for attaining a sufficient discharge capacity per volume when the Li/Me molar ratio is 1.15 to 1.30.

[Nonaqueous Electrolyte]

The nonaqueous electrolyte to be used in the nonaqueous electrolyte secondary battery according to the present embodiment is not limited, and one that is generally proposed to be used in a lithium battery or the like can be used. Examples of the nonaqueous solvent to be used for the nonaqueous electrolyte include, but are not limited to, cyclic carbonic acid esters such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethyl methyl carbonate; chain esters such as methyl formate, methyl acetate and methyl butyrate; tetrahydrofuran or a derivatives thereof; ethers such as 1,3-dioxane, 1,4-dioxane, 1,2-dimethoxy ether, 1,4-dibutoxyethane and methyl diglyme; nitriles such as acetonitrile and benzonitrile; dioxolane or derivatives thereof, ethylene sulfide, sulfolane, sultone or derivatives thereof. These compounds are used singly, or in mixture of two or more thereof.

Examples of the electrolyte salt to be used for the nonaqueous electrolyte include inorganic ionic salts containing one of lithium (Li), sodium (Na) and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$ and KSCN; and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate and lithium dodecylbenzenesulfonate. These ionic compounds can be used singly, or in combination of two or more thereof.

Further, use of a mixture of $LiPF_6$ or $LiBF_4$ with a lithium salt having a perfluoroalkyl group, such as $LiN(C_2F_5SO_2)_2$ is preferable because the viscosity of the electrolyte can be further reduced, so that low-temperature characteristics can be further improved, and self discharge can be suppressed.

In addition, a normal-temperature molten salt or an ionic liquid may be used as the nonaqueous electrolyte.

The concentration of the electrolyte salt in the nonaqueous electrolyte is preferably 0.1 mol/l to 5 mol/l, more preferably 0.5 mol/l to 2.5 mol/l for reliably obtaining a nonaqueous electrolyte battery having high battery characteristics.

[Negative Active Material]

The negative active material is not limited, and any material may be selected as long as it is in a form capable of precipitating or absorbing lithium ions. Examples thereof include a titanium-based materials such as lithium titanate having a spinel-type crystal structure, typically Li[$Li_{1/3}Ti_{5/3}$]$O_4$; alloy based materials based on Si, Sb, Sn and the like; lithium metals; lithium alloys (lithium metal-containing alloys such as lithium-silicon, lithium-aluminum, lithium-lead, lithium-tin, lithium-aluminum-tin, lithium-gallium and wood alloy); lithium composite oxides (lithium-titanium); silicon oxide; alloys capable of absorbing and releasing lithium; and carbon materials (e.g. graphite, hard carbon, low-temperature fired carbon and amorphous carbon).

Preferably, the powder of the negative active material has an average particle size of 100 μm or less. For obtaining the powder in a predetermined shape, a grinder or a classifier is used. For example, a mortar, a ball mill, a sand mill, a vibrating ball mill, a planetary ball mill, a jet mill, a counter jet mill, a swirling air jet-type jet mill, a sieve or the like is used. In grinding, wet grinding in which water or an organic solvent such as hexane coexists can be applied. The classification method is not particularly limited, and a sieve, a wind force classifier or the like is used as necessary in both dry and wet processes.

[Other Electrode Components]

While the positive active material and the negative active material which are main components of the positive electrode and the negative electrode have been described in detail above, the positive electrode and the negative electrode may contain a conductive agent, a binding agent, a thickener, a filler and so on in addition to the above-mentioned main components.

The conductive agent is not limited as long as it is an electron conductive material which does not adversely affect battery performance, and normally, conductive materials such as natural graphite (scaly graphite, scalelike graphite, earthy graphite and the like), artificial graphite, carbon black, acetylene black, ketjen black, carbon whiskers, carbon fibers, powders of metals (copper, nickel, aluminum, silver, gold and the like), metal fibers, and conductive ceramic materials can be included alone or as a mixture thereof.

Among them, acetylene black is preferable as the conductive agent from the viewpoint of electron conductivity and coatability. The addition amount of the conductive agent is preferably 0.1% by weight to 50% by weight, especially preferably 0.5% by weight to 30% by weight based on the total weight of the positive electrode or the negative electrode. In particular, it is preferable that acetylene black is ground into ultrafine particles of 0.1 to 0.5 μm in size because the necessary amount of carbon can be reduced. These mixing methods are physical mixing methods, and the ideal of these methods consists in uniform mixing. Thus, mixing can be performed in a dry process or a wet process using a powder mixer such as a V-shape mixer, an S-shape mixer, a Raikai mixer, a ball mill or a planetary ball mill.

As the binding agent, normally one of thermoplastic resins such as polytetrafluoroethylene (PTFE), polyvinylidene fluoride (PVDF), polyethylene and polypropylene; and polymers having rubber elasticity, such as ethylene-propylene-diene terpolymer (EPDM), sulfonated EPDM, styrene butadiene rubber (SBR) and fluorine rubber, or a mixture of two or more thereof can be used. The addition amount of the binding agent is preferably 1 to 50% by weight, especially preferably 2 to 30% by weight based on the total weight of the positive electrode or the negative electrode.

Any filler may be used as long as it does not adversely affect battery performance. Normally, an olefin-based polymer such as polypropylene or polyethylene, amorphous silica, alumina, zeolite, glass, carbon or the like is used. The addition amount of the filler is preferably 30% by weight or less based on the total weight of the positive electrode or the negative electrode.

The positive electrode and the negative electrode are more suitably prepared by mixing the above-mentioned main components (a positive active material in the positive electrode and a negative electrode material in the negative electrode) and other materials to obtain a mixture, mixing the mixture with an organic solvent such as N-methylpyrrolidone or toluene, or water, then applying or pressure-bonding the resulting mixture onto a current collector of an aluminum foil, a copper foil or the like, and performing a heating treatment at about 50° C. or 250° C. for about 2 hours. For the method for applying the mixture, it is preferable to apply the mixture in any thickness and in any shape using means such as roller coating with an applicator roll or the like, screen coating, a doctor blade method, spin coating or a bar coater, but the method is not limited thereto.

[Separator]

As the separator, it is preferable that a porous film, a nonwoven fabric or the like having excellent high rate discharge performance is used singly or in combination. Examples of the material that forms the separator for a nonaqueous electrolyte battery may include polyolefin-based resins, typically polyethylene, polypropylene and the like; polyester-based resins, typically polyethylene terephthalate, polybutylene terephthalate and the like; polyvinylidene fluoride; vinylidene fluoride-hexa fluoroethylene copolymers; vinylidene fluoride-perfluorovinyl ether copolymers; vinylidene fluoride-tetrafluoroethylene copolymers; vinylidene fluoride-trifluoroethylene copolymers; vinylidene fluoride-fluoroethylene copolymers; vinylidene fluoride-hexafluoroacetone copolymers; vinylidene fluoride-ethylene copolymers; vinylidene fluoride-propylene copolymers; vinylidene fluoride-trifluoropropylene copolymers; vinylidene fluoride-tetrafluoroethylene-hexafluoropropylene copolymers; and vinylidene fluoride-ethylene-tetrafluoroethylene copolymer.

The porosity of the separator is preferably 98% by volume or less from the viewpoint of strength. From the viewpoint of charge-discharge characteristics, the porosity is preferably 20% by volume or more.

For the separator, a polymer gel including a polymer such as acrylonitrile, ethylene oxide, propylene oxide, methyl methacrylate, vinyl acetate, vinyl pyrrolidone, polyvinylidene fluoride or the like and an electrolyte may be used. Use of the nonaqueous electrolyte in a gel state as described above is preferable because an effect of preventing liquid leakage is exhibited.

Further, use of the above-mentioned porous film or nonwoven fabric and polymer gel in combination as the separator is preferable because the liquid retainability of the electrolyte is improved. Specifically, a film in which a surface of a polyethylene microporous film and microporous wall surfaces are covered with a solvent-philic polymer having a thickness of several μm or less is formed, and an electrolyte is held in the micropores of the film, so that the solvent-philic polymer is gelled.

Examples of the solvent-philic polymer include polyvinylidene fluoride, and polymers an acrylate monomer having an ethylene oxide group, an ester group or the like, an epoxy monomer, a monomer having an isocyanate group, or the like is crosslinked. The monomer can be subjected to a crosslinking reaction by heating the polymer, or by using an ultraviolet (UV) ray, or active light such as an electron beam (EB), or the like in combination with a radical initiator.

[Configuration of Nonaqueous Electrolyte Secondary Battery]

The configuration of the nonaqueous electrolyte secondary battery according to this embodiment is not particularly limited, and examples thereof include cylindrical batteries having a positive electrode, a negative electrode and a roll-shaped separator, prismatic batteries (rectangular batteries), and flat batteries.

Figure 7:
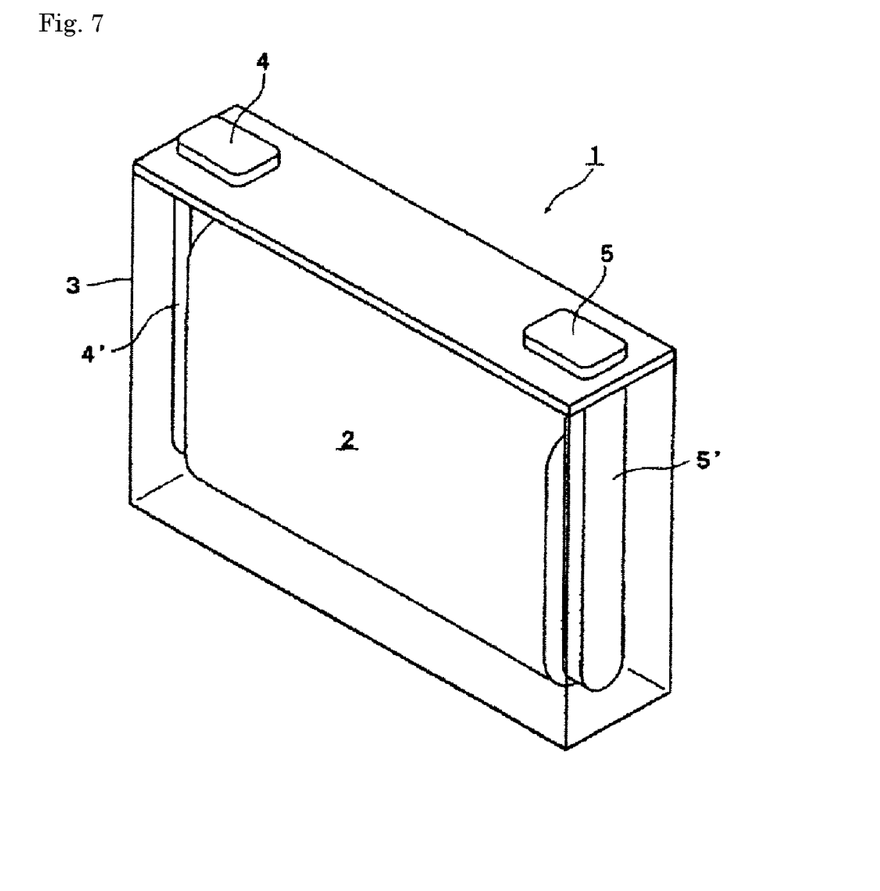
FIG. 7 is an external appearance perspective view showing a lithium secondary battery according to one aspect of the present invention.

FIG. 7 shows an external perspective view of a rectangular lithium secondary battery 1 which is a nonaqueous electrolyte secondary battery according to one aspect of the present invention. FIG. 7 is a view showing the inside of a container in a perspective manner. In the nonaqueous electrolyte secondary battery 1 shown in FIG. 7, an electrode group 2 is contained in a battery container 3. The electrode group 2 is formed by winding a positive electrode and a negative electrode with a separator interposed therebetween, the positive electrode including a positive active material, the negative electrode including a negative active material. The positive electrode is electrically connected to a positive electrode terminal 4 through a positive electrode lead 4' and the negative electrode is electrically connected to a negative electrode terminal 5 through a negative electrode lead 5'.

[Configuration of Power Storage Apparatus]

Figure 8:
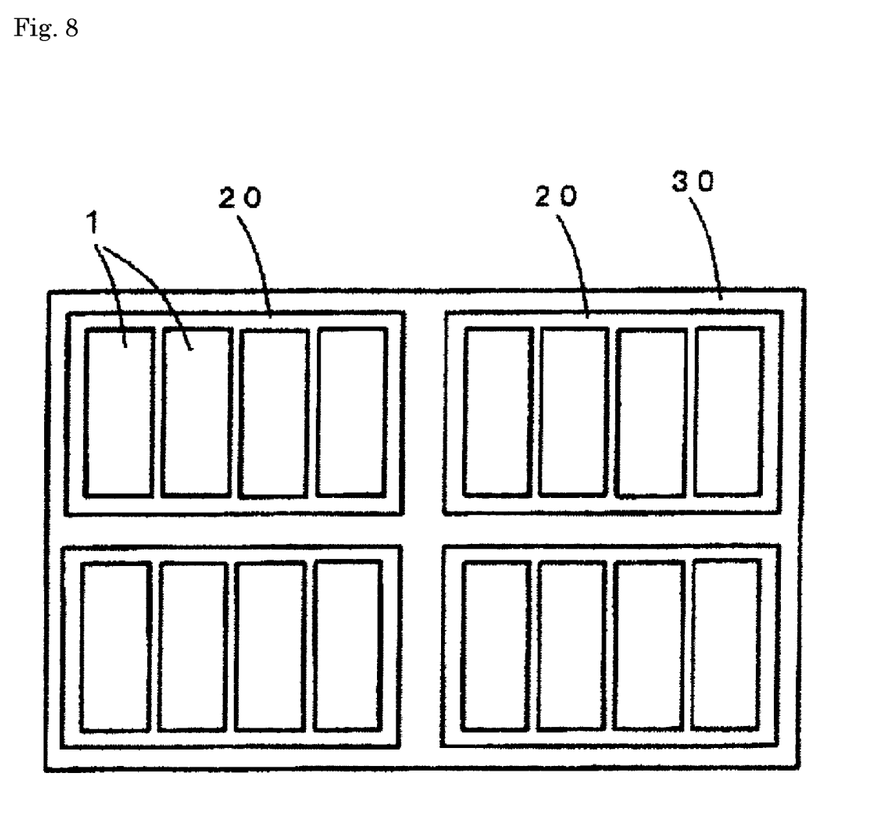
FIG. 8 is a schematic view showing an energy storage apparatus in which a plurality of lithium secondary batteries according to one aspect of the present invention are assembled.

This embodiment can also be implemented as a power storage apparatus in which a plurality of nonaqueous electrolyte secondary batteries described above are assembled. FIG. 8 shows a power storage apparatus according to one aspect of the present invention. In FIG. 8, a power storage apparatus 30 includes a plurality of power storage units 20. Each power storage unit 20 includes a plurality of nonaqueous electrolyte secondary batteries 1. The power storage apparatus 30 can be mounted as a power source for an automobile such as an electric vehicle (EV), a hybrid vehicle (HEV), a plug-in hybrid vehicle (PHEV), or the like.

EXAMPLES

Example 1

In preparation of an active material of an example, a hydroxide precursor was prepared using a reaction crystallization method. First, nickel sulfate hexahydrate (505.6 g), cobalt sulfate heptahydrate (112.6 g) and manganese sulfate pentahydrate (405.7 g) were weighed, and totally dissolved in 4 L of ion-exchange water to prepare a 1.0 M sulfate aqueous solution of which the molar ratio of Co:Ni:Mn was 48:10:42. Next, 2 L of ion exchange water was poured into a 5 L reaction tank, and an Ar gas was bubbled for 30 min to remove oxygen contained in the ion-exchange water. The temperature of the reaction tank was set at 50° C. (±2° C.), and the reaction tank layer was set so as to have a sufficient convection therein while the contents in the reaction tank was stirred at a rotation speed of 1500 rpm using a paddle impeller equipped with a stirring motor. The sulfate aqueous solution was added dropwise to the reaction tank at a rate of 1.5 ml/min for 44 hr. Here, during a time period between the start and the end of the dropwise addition, a mixed alkaline solution including 4.0 M sodium hydroxide, 0.5 M ammonia and 0.5 M hydrazine was appropriately added dropwise to perform control so that the pH in the reaction tank was always 11.0 (±0.1), and a part of the reaction solution was discharged through overflow to perform control so that the total amount of the reaction solution was always 2 L or less. After completion of dropwise addition, stirring the contents in the reaction tank was continued for further 3 h. After stirring was stopped, the reaction tank was left standing at room temperature for 12 h or more.

Next, hydroxide precursor particles generated in the reaction tank were separated using a suction filtration device, sodium ions deposited on the particles were further washed off by performing washing with 100 ml of ion-exchange water five times, and the particles were dried at 80° C. for 20 h under normal pressure in air atmosphere using an electric furnace. Thereafter, the particles were crushed by an automatic mortar made of agate for equalizing the particle size. In this way, a hydroxide precursor was prepared.

Lithium hydroxide monohydrate (1.030 g) was added to the hydroxide precursor (1.811 g), and the mixture was adequately mixed using an automatic mortar made of agate to prepare a mixed powder of which the molar ratio of Li (Ni, Co, Mn) was 120:100. The powder was molded at a pressure of 6 MPa using a pellet molding machine to form a pellet having a diameter of 25 mm. The amount of the mixed powder subjected to pellet molding was determined by performing conversion calculation so that the mass as an expected final product would be 2 g. One of the pellets was placed in an alumina boat having a total length of about 100 mm, the boat was placed in a box-type electric furnace (model: AMF 20), the temperature was elevated from ordinary temperature to 900° C. under normal pressure in an air atmosphere over 10 hours, and the pellet was fired at 900° C. for 5 h. The box-type electric furnace had an internal dimension of 10 cm (height), 20 cm (width) and 30 cm (depth), and provided with electrically heated wires at intervals of 20 cm in the width direction. After firing, a heater was switched off, and the alumina boat was naturally cooled as it was left standing in the furnace. As a result, the temperature of the furnace decreased to about 200° C. after 5 hours, but the subsequent temperature fall rate was slightly low. After elapse of a whole day and night, the pellet was taken out after confirming that the temperature of the furnace was not higher than 100° C., and crushed by an automatic mortar made of agate for equalizing the particle size. In this way, a lithium transition metal composite oxide $Li_{1.09}Ni_{0.44}Co_{0.09}Mn_{0.38}O_2$ according to Example 1 was prepared.

Example 2

Except that a hydroxide precursor was prepared in such a manner that the molar ratio of Ni:Co:Mn was 45:10:45, the same procedure as in Example 1 was carried out to prepare a lithium transition metal composite oxide according to Example 2.

Example 3

Except that a hydroxide precursor was prepared in such a manner that the molar ratio of Ni:Co:Mn was 42:10:48, the same procedure as in Example 1 was carried out to prepare a lithium transition metal composite oxide according to Example 3.

Example 4

Except that a hydroxide precursor was prepared in such a manner that the molar ratio of Ni:Co:Mn was 39:10:51, the same procedure as in Example 1 was carried out to prepare a lithium transition metal composite oxide according to Example 4.

Example 5

Except that a hydroxide precursor was prepared in such a manner that the molar ratio of Ni:Co:Mn was 36:10:54, the same procedure as in Example 1 was carried out to prepare a lithium transition metal composite oxide according to Example 5.

Example 6

Except that a hydroxide precursor was prepared in such a manner that the molar ratio of Ni:Co:Mn was 33:10:57, the same procedure as in Example 1 was carried out to prepare a lithium transition metal composite oxide according to Example 6.

Example 7

Except that a hydroxide precursor was prepared in such a manner that the molar ratio of Ni:Co:Mn was 30:10:60, the same procedure as in Example 1 was carried out to prepare a lithium transition metal composite oxide according to Example 7.

Example 8

Except that a hydroxide precursor was prepared in such a manner that the molar ratio of Ni:Co:Mn was 27:10:63, the same procedure as in Example 1 was carried out to prepare a lithium transition metal composite oxide according to Example 8.

Example 9

Except that a hydroxide precursor was prepared in such a manner that the molar ratio of Ni:Co:Mn was 24:10:66, the same procedure as in Example 1 was carried out to prepare a lithium transition metal composite oxide according to Example 9.

Examples 10 to 12

Except that a hydroxide precursor identical to the hydroxide precursor in Example 5, which was prepared in such a manner that the molar ratio of Ni:Co:Mn was 36:10:54, was used, and mixed powders having a molar ratio of Li:(Ni, Co, Mn) of 115:100, 125:100 and 130:100, respectively, rather than 120:100 were prepared and fired, the same procedure as in Example 1 was carried out to prepare lithium transition metal composite oxides according to Examples 10 to 12.

Examples 13 to 19

Except that a hydroxide precursor identical to the hydroxide precursor in Example 5, which was prepared in such a manner that the molar ratio of Ni:Co:Mn was 36:10:54, was used, and the firing temperature was changed from 900° C. to 800° C., 820° C., 840° C., 860° C., 880° C., 920° C. and 940° C., respectively, the same procedure as in Example 1 was carried out to prepare lithium transition metal composite oxides according to Examples 13 to 19.

Examples 20 to 22

Except that a hydroxide precursor identical to the hydroxide precursor in Example 2, which was prepared in such a manner that the molar ratio of Ni:Co:Mn was 45:10:45, was used, and mixed powders having a molar ratio of Li:(Ni, Co, Mn) of 115:100, 125:100 and 130:100, respectively, rather than 120:100 were prepared and fired, the same procedure as in Example 1 was carried out to prepare lithium transition metal composite oxides according to Examples 20 to 22.

Examples 23 to 25

Except that a hydroxide precursor identical to the hydroxide precursor in Example 8, which was prepared in such a manner that the molar ratio of Ni:Co:Mn was 27:10:63, was used, and mixed powders having a molar ratio of Li:(Ni, Co, Mn) of 115:100, 125:100 and 130:100, respectively, rather than 120:100 were prepared and fired, the same procedure as in Example 1 was carried out to prepare lithium transition metal composite oxides according to Examples 23 to 25.

Comparative Example 1

Except that a hydroxide precursor was prepared in such a manner that the molar ratio of Ni:Co:Mn was 52:10:38, the same procedure as in Example 1 was carried out to prepare a lithium transition metal composite oxide according to Comparative Example 1.

Comparative Example 2

Except that a hydroxide precursor was prepared in such a manner that the molar ratio of Ni:Co:Mn was 55:10:35, the same procedure as in Example 1 was carried out to prepare a lithium transition metal composite oxide according to Comparative Example 2.

Comparative Examples 3 to 6

Except that a hydroxide precursor identical to the hydroxide precursor in Example 5, which was prepared in such a manner that the molar ratio of Ni:Co:Mn was 36:10:54, was used, and mixed powders having a molar ratio of Li:(Ni, Co, Mn) of 110:100, 105:100, 135:100 and 140:100, respectively, rather than 120:100 were prepared and fired, the same procedure as in Example 1 was carried out to prepare lithium transition metal composite oxides according to Comparative Examples 3 to 6.

Comparative Examples 7 to 10

Except that a hydroxide precursor identical to the hydroxide precursor in Example 5, which was prepared in such a manner that the molar ratio of Ni:Co:Mn was 36:10:54, was used, and the firing temperature was changed from 900° C. to 770° C., 740° C., 960° C. and 1000° C., respectively, the same procedure as in Example 1 was carried out to prepare lithium transition metal composite oxides according to Comparative Examples 7 to 10.

Comparative Example 11

Cobalt sulfate heptahydrate (11.2 g), nickel sulfate hexahydrate (36.8 g) and manganese sulfate pentahydrate (53.0 g) were weighed, and totally dissolved in 200 mL of ion-exchange water to prepare a 2.0 M sulfate aqueous solution of which the molar ratio of Co:Ni:Mn was 10:35:55. Meanwhile, 750 ml of ion exchange-water was poured into a 2 L reaction tank, and a $CO_2$ gas was bubbled for 30 min to thereby dissolve the $CO_2$ gas in ion-exchange water. The temperature of the reaction tank was set at 50° C. (±2° C.), and the sulfate aqueous solution was added dropwise at a rate of 3 ml/min while the contents in the reaction tank was stirred at a rotation speed of 700 rpm using a paddle impeller equipped with a stirring motor. Here, the control was performed so that pH in the reaction tank was kept at 7.9 (±0.05) by appropriately adding dropwise an aqueous solution containing 2.0 M sodium carbonate and 0.4 M ammonia over a time period between the start and the end of dropwise addition. After completion of dropwise addition, stirring the contents in the reaction tank was continued for further 3 h. After stirring was stopped, the reaction tank was left standing for 12 h or more.

Next, coprecipitation carbonate particles generated in the reaction tank were separated using a suction filtration device, sodium ions deposited on the particles were further washed off using ion-exchange water, and the particles were dried at 80° C. for 20 h under normal pressure in air atmosphere using an electric furnace. Thereafter, the particles were crushed by an automatic mortar made of agate for equalizing the particle size. In this way, a coprecipitation carbonate precursor was prepared.

Except that the coprecipitation carbonate precursor was used in place of the hydroxide precursor prepared in Example 1, and a mixed powder having a molar ratio of Li:(Co, Ni, Mn) of 130:100 was prepared and fired, the same procedure as in Example 1 was carried out to prepare a lithium transition metal composite oxide according to Comparative Example 11.

Comparative Example 12

Except that a carbonate precursor was prepared in such a manner that the molar ratio of Ni:Co:Mn was 30:10:60, the same procedure as in Comparative Example 11 was carried out to prepare a lithium transition metal composite oxide according to Comparative Example 12.

Comparative Example 13

Except that a carbonate precursor was prepared in such a manner that the molar ratio of Ni:Co:Mn was 25:10:65, the same procedure as in Comparative Example 11 was carried out to prepare a lithium transition metal composite oxide according to Comparative Example 13.

Comparative Examples 14 and 15

Except that a carbonate precursor identical to the carbonate precursor in Comparative Example 12, which was prepared in such a manner that the molar ratio of Ni:Co:Mn was 30:10:60, was used, and mixed powders having a molar ratio of Li:(Co, Ni, Mn) of 125:100 and 120:100, respectively, were prepared and fired, the same procedure as in Comparative Example 11 was carried out to prepare lithium transition metal composite oxides according to Comparative Examples 14 and 15.

Comparative Example 16

Except that a hydroxide precursor was prepared in such a manner that the molar ratio of Ni:Co:Mn was 22:10:68, a mixed powder having a molar ratio of Li:(Co, Ni, Mn) of 150:100 was prepared, and the firing temperature was 1000° C., the same procedure as in Example 1 was carried out to prepare a lithium transition metal composite oxide according to Comparative Example 16.

Comparative Example 17

Except that a hydroxide precursor was prepared in such a manner that the molar ratio of Ni:Co:Mn was 33:33:33, a mixed powder having a molar ratio of Li:(Co, Ni, Mn) of 100:100 was prepared, and the firing temperature was 1000° C., the same procedure as in Example 1 was carried out to prepare a lithium transition metal composite oxide according to Comparative Example 17.

[Measurement of Full Width at Half Maximum]

The full width at half maximum for the lithium transition metal composite oxide according to each of Examples 1 to 25 and Comparative Examples 1 to 17 was measured using an X-ray diffractometer (manufactured by Rigaku Corporation, model name: MiniFlex II) in accordance with the above-mentioned conditions and procedure.

Figure 1:
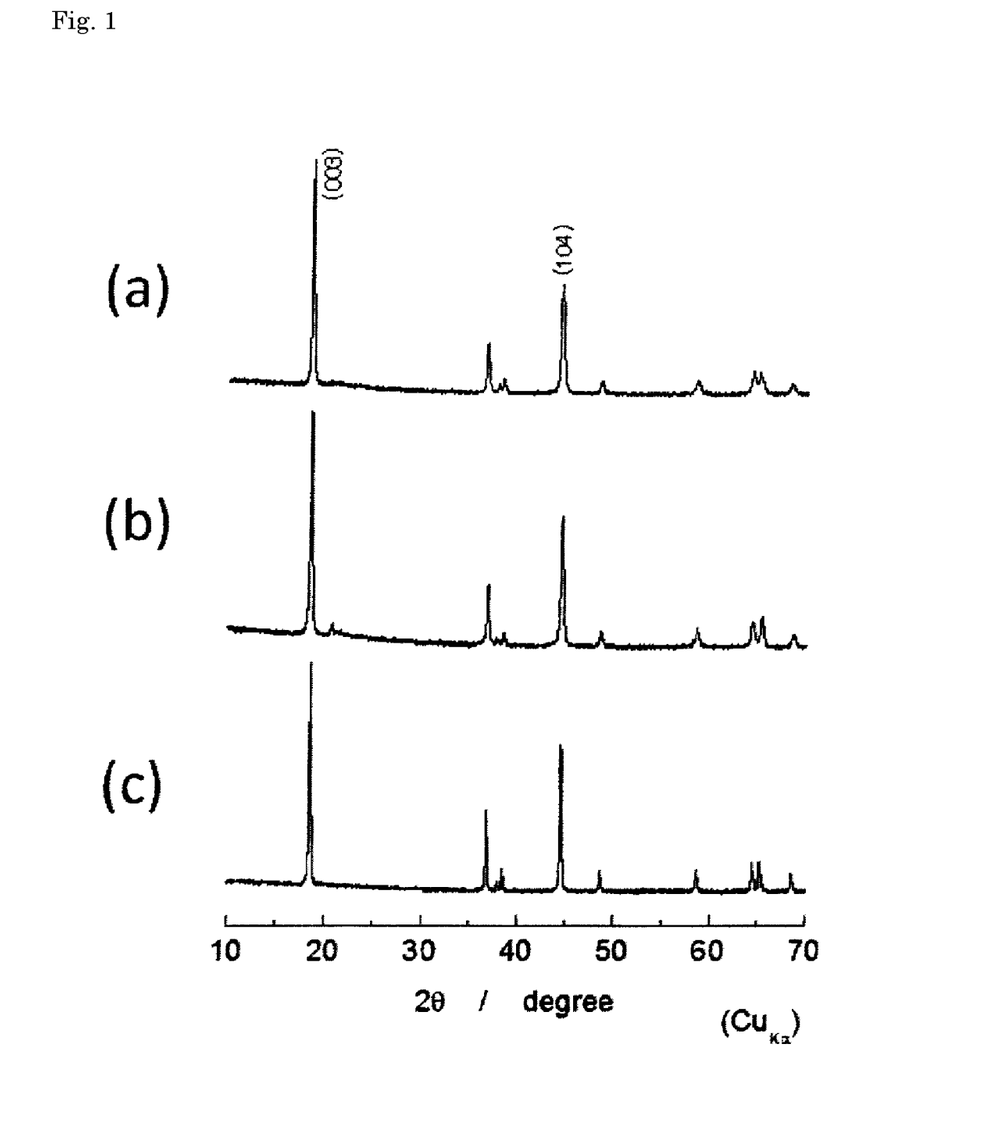
FIGS. 1(a), 1(b) and 1(c) show X-ray diffraction diagrams of lithium transition metal composite oxides according to an example and comparative examples.
Figure 2:
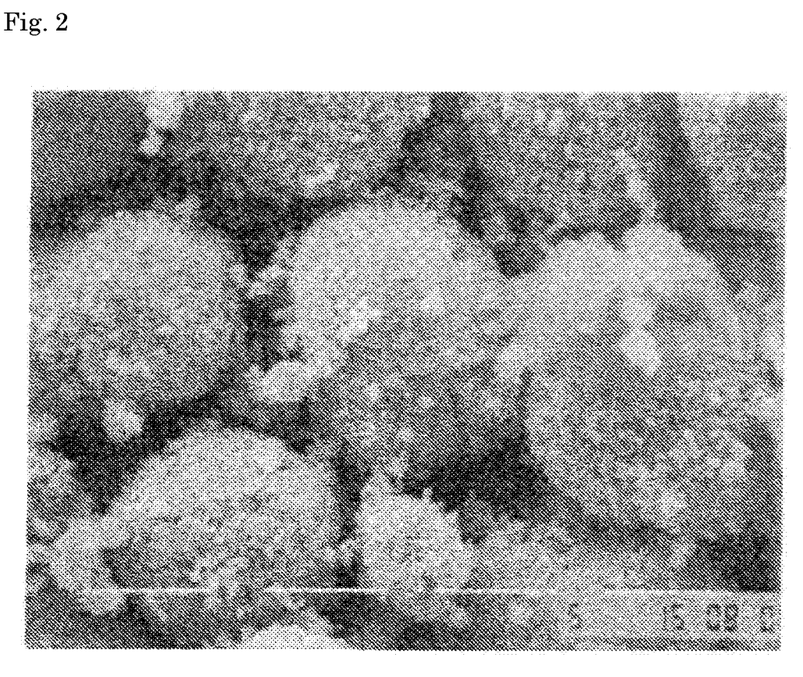
FIG. 2 shows a SEM photograph of a lithium transition metal composite oxide according to an example.

FIGS. 1(a), 1(b) and 1(c) show X-ray diffraction diagrams for the lithium transition metal composite oxides of Example 5, Comparative Example 13 and Comparative Example 17, respectively. FIGS. 2 to 4 show SEM photographs for the lithium transition metal composite oxides, respectively.

[Preparation and Evaluation of Nonaqueous Electrolyte Secondary Battery]

A test battery as a nonaqueous electrolyte secondary battery was prepared by the following procedure using the lithium transition metal composite oxide of each of Examples 1 to 25 and Comparative Examples 1 to 17 as a positive active material, and battery characteristics were evaluated.

A coating paste was prepared in which the active material, acetylene black (AB) and polyvinylidene fluoride (PVdF) were mixed at a ratio of 90:5:5 in terms of a weight ratio and dispersed with N-methylpyrrolidone as a dispersion medium. The coating paste was applied to one surface of an aluminum foil current collector having a thickness of 20 μm to prepare a positive electrode plate. The coating thickness of the active material coated per fixed area was equalized so that test conditions for determining a discharge capacity per volume were the same among the lithium secondary batteries of all Examples and Comparative Examples.

For the purpose of accurately observing the independent behavior of a positive electrode, metallic lithium was brought into close contact with a nickel foil current collector and used for a counter electrode, i.e. a negative electrode. Here, a sufficient amount of metallic lithium was placed on the negative electrode so that the capacity of the lithium secondary battery was not limited by the negative electrode.

As an electrolyte solution, a solution obtained by dissolving $LiPF_6$, in a concentration of 1 mol/l, in a mixed solvent of ethylene carbonate (EC)/ethylmethyl carbonate (EMC)/dimethyl carbonate (DMC) in a volume ratio of 6:7:7, was used. As a separator, a microporous film made of polypropylene, the surface of which was modified with polyacrylate, was used. As an outer case, a metal resin composite film made of polyethylene terephthalate (15 μm)/aluminum foil (50 μm)/metal-adhesive polypropylene film (50 μm) was used. The electrode was stored such that the open ends of a positive electrode terminal and a negative electrode terminal were externally exposed. Fusion margins with the inner surfaces of the aforementioned metal resin composite films facing each other were airtightly sealed except a portion forming an electrolyte solution filling hole. The electrolyte solution was injected, followed by sealing the electrolyte solution filling hole.

The lithium secondary battery prepared in the procedure described above was subjected to an initial charge-discharge step at 25° C. Charge was constant current constant voltage charge with a current of 0.1 CmA and a voltage of 4.6 V, and the charge termination condition was set at a time point at which the current value decreased to ⅙. Discharge was constant current discharge with a current of 0.1 CmA and a final voltage of 2.0 V. This charge-discharge was carried out 2 cycles. Here, a quiescent period of 30 minutes was provided each after charge and after discharge.

Next, a 1 cycle charge-discharge test was conducted. Charge was constant current constant voltage charge with a current of 1 CmA and a voltage of 4.45 V, and the charge termination condition was set at a time point at which the current value decreased to ⅙. Discharge was constant current discharge with a current of 1 CmA and a final voltage of 2.0 V. Here, a quiescent period of 10 minutes was provided each after charge and after discharge. The discharge capacity (mAh/g) of the positive active material in this cycle was recorded, and a discharge capacity per volume "1 C capacity (mAh/cc)" was calculated using the value of the true density (g/cc) of each positive electrode active material which was measured by pycnometry (ULTRAPYCNOMETER 1000 manufactured by Quntachrome) beforehand.

[Measurement of Peak Differential Pore Volume]

For measurement of the peak differential pore volume of the lithium transition metal composite oxide particles according to each of Examples 1 to 25 and Comparative Examples 1 to 17, the test battery in a discharged state was disassembled to take out a positive electrode plate, lithium transition metal composite oxide particles as an active material in the positive electrode plate were collected in accordance with the above-described procedure, and the particles were measured using "autosorb iQ" manufactured by Quantachrome Instruments Inc., and control/analysis software "ASiQwin".

Tables 1 and 2 show the ratios of Li/Me, Mn/Me, Ni/Me and Co/Me, the transition metal element coprecipitation precursor, the firing temperature, the FWHM (104), the ratio FWHM (003)/FWHM (104) (FWHM ratio) and the peak differential pore volume for the lithium transition metal composite oxide according to each of Examples 1 to 25 and Comparative Examples 1 to 17, and the 1 C capacity of a lithium secondary battery obtained using the lithium transition metal composite oxide as a positive active material.

TABLE 1

| | Li/Me | Ni/Me | Co/Me | Mn/Me | Transition metal coprecipitation precursor |
|---|---|---|---|---|---|
| Example 1 | 1.2 | 0.48 | 0.10 | 0.42 | Hydroxide |
| Example 2 | 1.2 | 0.45 | 0.10 | 0.45 | Hydroxide |
| Example 3 | 1.2 | 0.42 | 0.10 | 0.48 | Hydroxide |
| Example 4 | 1.2 | 0.39 | 0.10 | 0.51 | Hydroxide |
| Example 5 | 1.2 | 0.36 | 0.10 | 0.54 | Hydroxide |
| Example 6 | 1.2 | 0.33 | 0.10 | 0.57 | Hydroxide |
| Example 7 | 1.2 | 0.30 | 0.10 | 0.60 | Hydroxide |
| Example 8 | 1.2 | 0.27 | 0.10 | 0.63 | Hydroxide |
| Example 9 | 1.2 | 0.24 | 0.10 | 0.66 | Hydroxide |
| Example 10 | 1.15 | 0.36 | 0.10 | 0.54 | Hydroxide |
| Example 11 | 1.25 | 0.36 | 0.10 | 0.54 | Hydroxide |
| Example 12 | 1.3 | 0.36 | 0.10 | 0.54 | Hydroxide |
| Example 13 | 1.2 | 0.36 | 0.10 | 0.54 | Hydroxide |
| Example 14 | 1.2 | 0.36 | 0.10 | 0.54 | Hydroxide |
| Example 15 | 1.2 | 0.36 | 0.10 | 0.54 | Hydroxide |
| Example 16 | 1.2 | 0.36 | 0.10 | 0.54 | Hydroxide |
| Example 17 | 1.2 | 0.36 | 0.10 | 0.54 | Hydroxide |
| Example 18 | 1.2 | 0.36 | 0.10 | 0.54 | Hydroxide |
| Example 19 | 1.2 | 0.36 | 0.10 | 0.54 | Hydroxide |
| Example 20 | 1.15 | 0.45 | 0.10 | 0.45 | Hydroxide |
| Example 21 | 1.25 | 0.45 | 0.10 | 0.45 | Hydroxide |
| Example 22 | 1.3 | 0.45 | 0.10 | 0.45 | Hydroxide |
| Example 23 | 1.15 | 0.27 | 0.10 | 0.63 | Hydroxide |
| Example 24 | 1.25 | 0.27 | 0.10 | 0.63 | Hydroxide |
| Example 25 | 1.3 | 0.27 | 0.10 | 0.63 | Hydroxide |
| Comparative Example 1 | 1.2 | 0.52 | 0.10 | 0.38 | Hydroxide |
| Comparative Example 2 | 1.2 | 0.55 | 0.10 | 0.35 | Hydroxide |
| Comparative Example 3 | 1.1 | 0.36 | 0.10 | 0.54 | Hydroxide |
| Comparative Example 4 | 1.05 | 0.36 | 0.10 | 0.54 | Hydroxide |
| Comparative Example 5 | 1.35 | 0.36 | 0.10 | 0.54 | Hydroxide |
| Comparative Example 6 | 1.4 | 0.36 | 0.10 | 0.54 | Hydroxide |
| Comparative Example 7 | 1.2 | 0.36 | 0.10 | 0.54 | Hydroxide |
| Comparative Example 8 | 1.2 | 0.36 | 0.10 | 0.54 | Hydroxide |
| Comparative Example 9 | 1.2 | 0.36 | 0.10 | 0.54 | Hydroxide |
| Comparative Example 10 | 1.2 | 0.36 | 0.10 | 0.54 | Hydroxide |
| Comparative Example 11 | 1.3 | 0.35 | 0.10 | 0.55 | Carbonate |
| Comparative Example 12 | 1.3 | 0.30 | 0.10 | 0.60 | Carbonate |
| Comparative Example 13 | 1.3 | 0.25 | 0.10 | 0.65 | Carbonate |
| Comparative Example 14 | 1.25 | 0.30 | 0.10 | 0.60 | Carbonate |
| Comparative Example 15 | 1.2 | 0.30 | 0.10 | 0.60 | Carbonate |
| Comparative Example 16 | 1.5 | 0.22 | 0.10 | 0.68 | Hydroxide |
| Comparative Example 17 | 1 | 0.33 | 0.33 | 0.33 | Hydroxide |

TABLE 2

| | Firing temperature [° C.] | FWHM (104) [deg] | FWHM ratio | Peak differential pore volume [mm³/(g · nm)] | 1 C capacity [mAh/cc] |
|---|---|---|---|---|---|
| Example 1 | 900 | 0.212 | 0.69 | 0.31 | 540 |
| Example 2 | 900 | 0.217 | 0.65 | 0.31 | 545 |
| Example 3 | 900 | 0.221 | 0.64 | 0.32 | 551 |
| Example 4 | 900 | 0.228 | 0.62 | 0.32 | 557 |
| Example 5 | 900 | 0.234 | 0.62 | 0.32 | 562 |
| Example 6 | 900 | 0.243 | 0.61 | 0.32 | 568 |
| Example 7 | 900 | 0.251 | 0.60 | 0.33 | 562 |
| Example 8 | 900 | 0.26 | 0.58 | 0.33 | 557 |
| Example 9 | 900 | 0.267 | 0.57 | 0.33 | 550 |
| Example 10 | 900 | 0.215 | 0.70 | 0.18 | 553 |
| Example 11 | 900 | 0.242 | 0.63 | 0.20 | 552 |
| Example 12 | 900 | 0.223 | 0.68 | 0.20 | 546 |
| Example 13 | 800 | 0.544 | 0.57 | 0.32 | 540 |
| Example 14 | 820 | 0.483 | 0.59 | 0.30 | 543 |
| Example 15 | 840 | 0.421 | 0.61 | 0.29 | 549 |
| Example 16 | 860 | 0.358 | 0.62 | 0.26 | 556 |
| Example 17 | 880 | 0.295 | 0.64 | 0.20 | 559 |
| Example 18 | 920 | 0.223 | 0.68 | 0.17 | 560 |
| Example 19 | 940 | 0.21 | 0.72 | 0.15 | 552 |
| Example 20 | 900 | 0.211 | 0.69 | 0.17 | 554 |
| Example 21 | 900 | 0.225 | 0.67 | 0.20 | 546 |
| Example 22 | 900 | 0.213 | 0.67 | 0.25 | 540 |
| Example 23 | 900 | 0.235 | 0.69 | 0.17 | 546 |
| Example 24 | 900 | 0.241 | 0.72 | 0.18 | 558 |
| Example 25 | 900 | 0.218 | 0.72 | 0.19 | 553 |
| Comparative Example 1 | 900 | 0.198 | 0.74 | 0.17 | 522 |
| Comparative Example 2 | 900 | 0.176 | 0.79 | 0.17 | 517 |
| Comparative Example 3 | 900 | 0.196 | 0.82 | 0.17 | 519 |
| Comparative Example 4 | 900 | 0.183 | 0.89 | 0.17 | 515 |
| Comparative Example 5 | 900 | 0.181 | 0.73 | 0.19 | 508 |
| Comparative Example 6 | 900 | 0.168 | 0.77 | 0.19 | 502 |
| Comparative Example 7 | 770 | 0.721 | 0.55 | 0.37 | 520 |
| Comparative Example 8 | 740 | 0.765 | 0.53 | 0.58 | 508 |
| Comparative Example 9 | 960 | 0.177 | 0.75 | 0.17 | 520 |
| Comparative Example 10 | 1000 | 0.126 | 0.83 | 0.15 | 503 |
| Comparative Example 11 | 900 | 0.244 | 0.80 | 0.80 | 430 |
| Comparative Example 12 | 900 | 0.268 | 0.76 | 0.86 | 435 |
| Comparative Example 13 | 900 | 0.28 | 0.76 | 0.95 | 442 |
| Comparative Example 14 | 900 | 0.305 | 0.81 | 0.73 | 432 |
| Comparative Example 15 | 900 | 0.323 | 0.85 | 0.68 | 428 |
| Comparative Example 16 | 1000 | 0.172 | 0.97 | 0.19 | 413 |
| Comparative Example 17 | 1000 | 0.144 | 1.00 | 0.11 | 520 |

Figure 5:
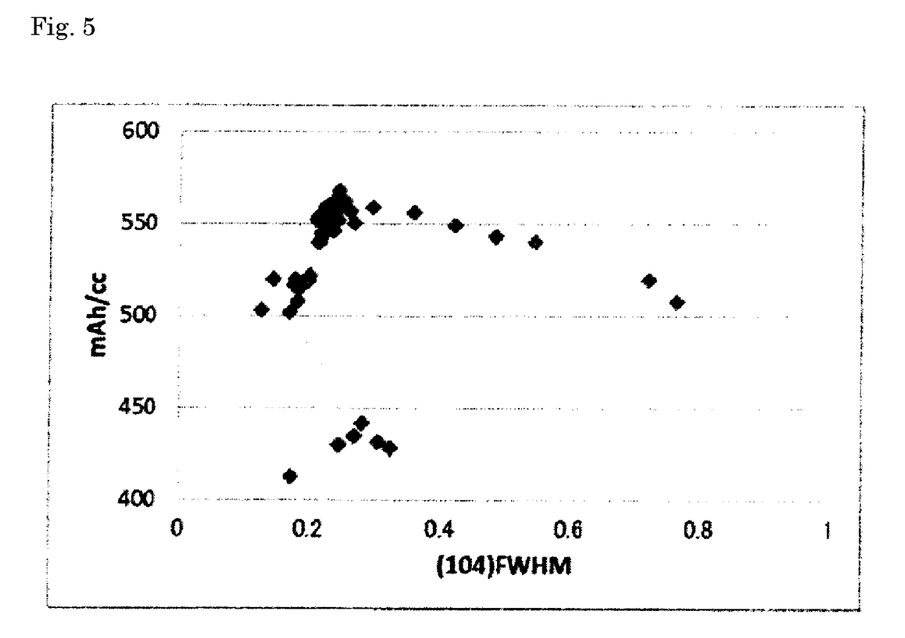
FIG. 5 shows a relationship diagram between a FWHM (104) and a discharge capacity per volume.
Figure 6:
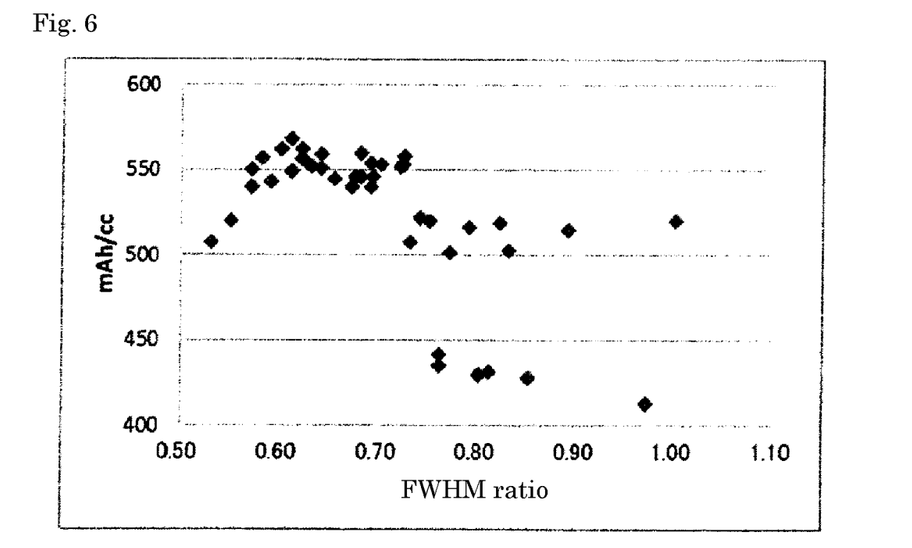
FIG. 6 shows a relationship diagram between a ratio FWHM (003)/FWHM (104) and a discharge capacity per volume.

From Tables 1 and 2 and FIGS. 5 and 6, it is apparent that in the case of the lithium transition metal composite oxides according to Examples 1 to 25 which have a crystal structure in which the FWHM (104) is 0.21° or more and 0.55° or less, and the ratio FWHM (003)/FWHM (104) is 0.72 or less and which have a peak differential pore volume of 0.33 mm³/(g·nm) or less, a large 1 C capacity per volume is obtained.

Such a crystal structure is obtained when the composite oxide has a composition in which the ratio Li/Me is 1.15 or more and 1.30 or less, the ratio Mn/Me is 0.42 to 0.66, and the ratio Co/Me is less than 0.24, the coprecipitated precursor is a hydroxide, and firing is performed at a temperature of 900 to 940° C.

It is thought that when the ratio Mn/Me is small, or the ratio Li/Me falls out of a range of 1.15 to 1.30 as in the case of the lithium transition metal composite oxides according to Comparative Examples 1 to 6, the FWHM (104) is small, so that the crystallite is excessively developed, and the ratio FWHM (003)/FWHM (104) exceeds 0.72, and the thickness orthogonal to the c-axis direction is relatively large, so that transportation efficiency of Li ions is reduced, resulting in a decrease in 1 C capacity.

Examples 13 to 19 and Comparative Examples 7 to 10 show the influence of the firing temperature.

In Comparative Examples 7 and 8 where the firing temperature is lower than 800° C., the FWHM (104) is large, so that crystallization does not sufficiently proceed, and therefore the 1 C capacity is low. In the lithium transition metal composite oxides of Comparative Examples 9 and 10 where the firing temperature exceeds 940° C., the ratio FWHM (003)/FWHM (104) exceeds 0.72, and the 1 C capacity is low.

On the other hand, in Examples 13 to 19, the FWHM (104) is 0.21° to 0.55°, and the ratio FWHM (003)/FWHM (104) is 0.72 or less, and a high 1 C capacity is obtained.

In the lithium transition metal composite oxides according to Comparative Examples 11 to 15, a carbonate is used as a coprecipitation precursor. When a carbonate precursor is used, the peak differential pore volume increases, the discharge capacity per volume decreases, and the 1 C capacity is low.

The lithium transition metal composite oxide according to Comparative Example 16 has a composition in which the ratios of Li/Me and Mn/Me each exceed the range in this embodiment, with the ratio Li/Me being 1.5 and the ratio Mn/Me being 0.68, and the lithium transition metal composite oxide is fired at a high temperature of 1000° C. In such an active material, crystallinity is high (FWHM (104) is small), and a large crystallite is formed, so that the bulk density cannot be increased, and the 1 C capacity cannot be increased.

Since the lithium transition metal composite oxide according to Comparative Example 17 is an active material of "LiMeO₂-type" that is not so-called a "lithium-excess-type", the lithium transition metal composite oxide does not take advantage of high capacity property of the "lithium-excess-type".

INDUSTRIAL APPLICABILITY

By using a positive active material containing a lithium transition metal composite oxide according to one aspect of the present invention, nonaqueous electrolyte secondary battery having a large discharge capacity per volume can be provided, and therefore the lithium secondary battery is useful as a lithium secondary battery for hybrid cars and electric cars.

DESCRIPTION OF REFERENCE SIGNS

1 Nonaqueous electrolyte secondary battery (lithium secondary battery)
2 Electrode group
3 Battery container
4 Positive electrode terminal
4' Positive electrode lead
5 Negative electrode terminal 5' Negative electrode lead
20 Power storage unit
30 Power storage apparatus

The invention claimed is:

1. A positive active material for a nonaqueous electrolyte secondary battery, comprising a lithium transition metal composite oxide,
wherein
a molar ratio (Li/Me) of Li and a transition metal (Me) that form the lithium transition metal composite oxide is 1.15 or more and 1.30 or less,
the transition metal (Me) includes Mn, Ni and Co,
the lithium transition metal composite oxide has an α-$NaFeO_2$-type crystal structure, an X-ray diffraction pattern attributable to a space group R3-m, and a full width at half maximum (FWHM (104)) for the diffraction peak of the (104) plane at a Miller index hkl in X-ray diffraction measurement using a CuKα ray of 0.21° or more and 0.55° or less,
a ratio (FWHM (003)/FWHM (104)) of a full width at half maximum for the diffraction peak of the (003) plane to the full width at half maximum for the diffraction peak of the (104) plane is 0.72 or less, and
particles of the lithium transition metal composite oxide have a peak differential pore volume of 0.32 $mm^3$/(g·nm) or less as determined by a BJH method from an adsorption isotherm using a nitrogen gas adsorption method.

2. A positive active material for a nonaqueous electrolyte secondary battery, comprising a lithium transition metal composite oxide,
wherein
a molar ratio (Li/Me) of Li and a transition metal (Me) that form the lithium transition metal composite oxide is more than 1,
the transition metal (Me) includes Mn, Ni and Co,
the lithium transition metal composite oxide has an α-$NaFeO_2$-type crystal structure, an X-ray diffraction pattern attributable to a space group $P3_112$, and a full width at half maximum (FWHM (114)) for the diffraction peak of the (114) plane at a Miller index hkl in X-ray diffraction measurement using a CuKα ray of 0.21° or more and 0.55° or less,
a ratio (FWHM (003)/FWHM (114)) of a full width at half maximum for the diffraction peak of the (003) plane to the full width at half maximum for the diffraction peak of the (114) plane is 0.72 or less, and
particles of the lithium transition metal composite oxide have a peak differential pore volume of 0.32 $mm^3$/(g·nm) or less as determined by a BJH method from an adsorption isotherm using a nitrogen gas adsorption method.

3. The positive active material for a nonaqueous electrolyte secondary battery according to claim 1, wherein the ratio FWHM (003)/FWHM (104) is 0.57 or more.

4. The positive active material for a nonaqueous electrolyte secondary battery according to claim 2, wherein the ratio FWHM (003)/FWHM (114) is 0.57 or more.

5. The positive active material for a nonaqueous electrolyte secondary battery according to claim 1, wherein the molar ratio (Mn/Me) of the Mn and the transition metal is 0.42 or more and 0.66 or less.

6. The positive active material for a nonaqueous electrolyte secondary battery according to claim 1, wherein the molar ratio (Co/Me) of Co and the transition metal is less than 0.24.

7. An electrode for a nonaqueous electrolyte secondary battery which comprises the positive active material according to claim 1.

8. A nonaqueous electrolyte secondary battery comprising the electrode for a nonaqueous electrolyte secondary battery according to claim 7.

9. A method for producing the positive active material for a nonaqueous electrolyte secondary battery according to claim 1, the method comprising firing a hydroxide precursor of the transition metal and a lithium compound at a temperature of 800° C. or higher and 940° C. or lower.

* * * * *